UNITED STATES PATENT OFFICE 2,187,208

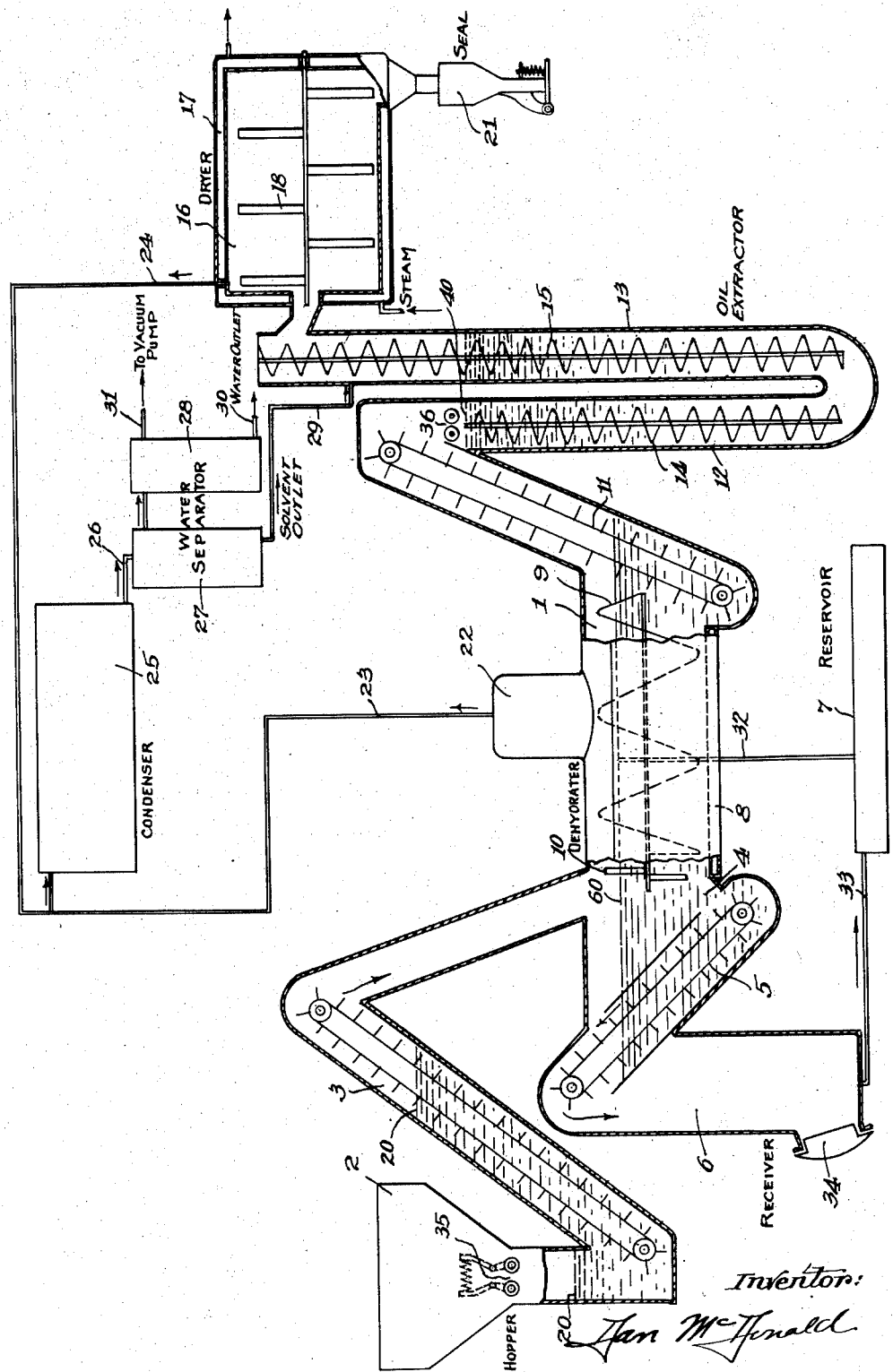

DEHYDRATION

Dan McDonald, Manhattan Beach, Calif., assignor to Engineering Incorporated, a corporation of California Application June 12, 1936, Serial No. 84,849

14 Claims. (Cl. 260—412.8)

This invention relates to dehydration of materials such as garbage, meal of various kinds, meat scraps, fish, vegetables, fruits, etc., preferably preparatory to solvent extraction of oil from the material; and has for its object to utilize an oil bath for heat transfer to the material being dried.

It is a further object of the invention to employ a suitable solvent for recovering from the dehydrated material the oil which has formed the heat transferring medium, and to preferably also employ the solvent for extracting the original oil content of the material.

It is a still further object of the invention to provide a process whereby the solvent which has been employed for extracting oil from the dehydrated material may be distilled for recovery of the oil for reuse in the oil bath, and for recovery of the clean solvent for reuse in extracting oil from the dehydrated material.

It is a still further object of the invention to distil the solvent in the chamber in which the material is being dehydrated, whereby the oil of this distillation process again forms a part of the oil bath used in the dehydrating process, while the solvent vapors are carried off with the aqueous vapors of the dehydrating process for subsequent condensation and separation of the solvent and the water.

More particularly it is an object of the invention to maintain the system under partial vacuum and to heat the oil bath to a temperature well above the vapor point of the moisture in the material which is to be dehydrated, whereby an efficient heat transfer is provided for rapidly evaporating this moisture; and to then remove the oil from the dehydrated material by use of a solvent having a relatively low latent heat as compared with that of the moisture which has been vaporized during the dehydrating process, in order that the oil may be efficiently removed and the solvent may be evaporated and recovered with economical heat consumption.

It is a still further object of the invention to provide a continuous process, with the material which is to be treated passing continuously through the oil bath for dehydration and thence being passed continuously through a receptacle containing a solvent which extracts the oil from the dehydrated material, and finally passing continuously through a dryer wherein the last traces of solvent are evaporated and from whence the residual material is continuously discharged.

It is a still further object of the invention to provide a continuous process, operating under a partial vacuum which is sealed at the intake and at the discharge at which the material is continuously supplied to and withdrawn from the system.

It is a still further object of the invention to provide a continuous system wherein the solvent which has extracted oil from the material which has been dehydrated in the oil bath, is continuously supplied to the extraction chamber and is continuously withdrawn therefrom and discharged into the oil bath for distillation therein, with the aqueous and solvent vapors from the oil bath and the solvent vapors from the dryer continuously withdrawn.

Further objects of the invention will be readily understood from the following description of the accompanying drawing which shows a preferred apparatus for dehydrating and then extracting oil from material such as garbage; it being understood that the same process of dehydration by utilizing an oil bath with subsequent removal of the oil by means of a suitable solvent may be employed in connection with other materials, with necessary modifications of the apparatus to meet the requirements of the particular material.

For example, in the apparatus disclosed the material to be dried is first dehydrated and then the oil which has been used in the dehydrating process together with any oil which may have formed a part of the original material is removed from the dehydrated material by use of a suitable solvent, such apparatus being particularly applicable to dehydration of garbage, fish, animal scraps, and the like. On the other hand, when the original material contains a valuable oil the recovery of which is of primary importance, for example the extraction of oil from orange peel, etc., the material may be first subjected to a suitable extraction process, such as a solvent extraction process, and the material from which the valuable oil has been thus first recovered but which it is difficult to then dry, may then be dehydrated in a bath of oil, with subsequent solvent extraction of the oil which has been used in the dehydrating process. Furthermore the oil for the dehydrating process may be furnished by the grease which is a constituent of the material being dehydrated, garbage and animal scraps for example; or the process may be employed for dehydrating materials which contain no grease, vegetables and fruits for example, in which case the oil for the dehydrating bath may be any suitable mineral oil or the like, supplied to the apparatus from an extraneous source.

The invention is particularly described with reference to dehydration and extraction of oil from garbage, the apparatus preferably including a dehydrating chamber 1 which is continuously supplied with garbage from a hopper 2 via a conveyor 3, with heavy inorganic matter which may be present with the garbage, e. g. glass, metal, etc., removed by gravity at the outlet 4 and carried by a conveyor 5 to a receiver 6. An oil bath 60 is maintained in the chamber 1, with excess oil overflowing into a stand pipe 32 which leads to an oil reservoir 7, and with the oil bath maintained at the desired temperature by a steam jacket 8 which surrounds the lower part of the chamber 1 to the level of the oil bath.

The garbage is continuously moved along the chamber 1 by a spiral conveyor 9 which may have paddles 10 for disintegrating the garbage to insure gravity discharge of extraneous material at the outlet 4; and a conveyor 11 continuously elevates the dehydrated garbage at the exit end of the chamber 1 and dumps it into an oil extractor which is preferably a U-tube 12—13 containing a suitable solvent. The U-tube has spiral conveyors 14—15 in its respective legs, the conveyor 14 moving the dehydrated garbage down the leg 12 of the extractor and the conveyor 15 then elevating the garbage through the leg 13 of the extractor. The dehydrated garbage from which the solvent has extracted the oil, is discharged from the leg 13 of the extractor into a suitable dryer 16, the material being preferably agitated and moved continuously along the dryer by paddles 18, and a steam jacket 17 maintaining the desired temperature for evaporating and removing all remaining traces of the solvent.

The system is preferably a closed system under partial vacuum with the supply hopper 2 preferably sealed by a body of oil which is shown at 20 and through which the material which is to be treated may be continuously supplied to the system, and with the dehydrated garbage which passes through the dryer continuously discharging via a suitable seal 21.

The partial vacuum in the system withdraws vapors from the chamber 1 at a dome 22 which communicates with a conduit 23, and the partial vacuum in the system also withdraws vapors from the dryer 16 via a conduit 24. The vapors from the conduits 23—24 are passed through a condenser 25 from whence the condensate is drawn into a water separator via a conduit 26, the solvent condensate collecting in a tank 27 and the condensed water collecting in a tank 28; and a conduit 31 leads from the water separator to a suitable vacuum pump (not shown) whereby the system is maintained under partial vacuum. The water which collects in the tank 28 may be withdrawn via a drain pipe 30, and the solvent from the tank 27 is supplied via pipe 29 to the upper end of the leg 13 of the oil extractor and overflows thence into the dehydrating chamber 1, thereby flowing through the U-tube 12—13 counter-current to the movement of the material which is being processed.

The garbage when first supplied to the hopper 2 may be passed between rollers 35 which are preferably urged toward one another by suitable springs so that they may yield to permit passage of extraneous material such as glass or metal which the rollers cannot crush, and such extraneous material, which is subsequently collected in the receiver 6, may be periodically removed from this receiver through a normally closed outlet 34. Any grease or oil settling from the material which is thus collected in the receiver 6 may be drained off and returned to the reservoir 7 via a pipe 33.

After its dehydration in the chamber 1, the garbage is preferably ground before the solvent in the U-tube 12—13 extracts the oil from the garbage, and for this purpose grinding rollers 36 may be provided at the upper end of the leg 12 of the solvent extractor.

The garbage to be dehydrated is supplied at the hopper 2, with the liquid for the seal 20 preferably supplied by the grease which settles from the garbage, to which additional oil may be added if necessary in order to create the desired seal when first starting the dehydrating process; and the conveyor 3 is of a height whereby the vacuum in the system elevates the sealing liquid in this conveyor to a level short of overflow into the dehydrating chamber 1. The oil bath 60 is maintained by the grease which is a part of the garbage, being replenished during the process as hereinafter described; but at the start of the process grease may be supplied to the chamber 1 from any suitable source in order to initially raise the oil bath to the desired level.

With the system under partial vacuum, e. g. in the neighborhood of 26" Hg., the oil bath is maintained at a temperature well above the vapor point of the moisture of the garbage, e. g. approximately 200 degrees, F., and the oil bath thus provides an efficient heat transfer, whereby the moisture of the garbage with its relatively high latent heat of vaporization may be rapidly evaporated, with the aqueous vapors withdrawn at the dome 22.

The garbage, when it is withdrawn via the conveyor 11 is thus in a dehydrated condition, but contains some quantity of the oil which has formed the oil bath, together with the grease and oil content of the garbage which has not settled out in the oil bath. This oil and grease is extracted from the dehydrated garbage, preferably by a suitable solvent, such as the chlorinated solvents, trichlorethylene, etc. The solvent is supplied via the conduit 29 to the U-tube 12—13, and flows through the U-tube counter to the direction of movement of the garbage which is being processed, so as to extract oil and grease from the dehydrated garbage. The garbage is then passed through the dryer 16 where any remaining traces of solvent are readily evaporated under the partial vacuum which is maintained in the system, comparatively little heat being required for evaporating the remaining traces of solvent due to the relatively low latent heat of solvents such as trichlorethylene. The dehydrated garbage, freed of all solvent, is then continuously withdrawn past the seal 21.

The solvent in the U-tube 12—13 which has dissolved the oils, fats and greases of the garbage, is distilled for separate recovery of the solvent and the oil, and this distillation is preferably accomplished in the dehydrating chamber 1, utilizing the heat of the oil bath 60. For this purpose the solvent overflows into the conveyor 11 and thence into the chamber 1, where the heat of the oil bath readily evaporates the solvent under the partial vacuum in the system, with the solvent vapors withdrawn at the dome 22 along with the aqueous vapors of the dehydrating process, and the oil replenishing the supply of oil which constitutes the oil bath 60.

The vapors of the dehydration and distillation processes are drawn into the condenser 25 by the partial vacuum in the system, and the solvent condensate is separated and then returned to the U-tube 12—13 for reuse in extracting oil from the dehydrated garbage.

The process thus provides for rapid dehydration of garbage or other material by means of an oil bath, with the oil of the dehydrated material then extracted by a suitable solvent, and the solvent then distilled, preferably in the oil bath, with all traces of solvent then removed by evaporation, and the evaporation of moisture and of solvent and the distillation of the solvent being preferably under vacuum. The material is thus readily dehydrated by efficient heat transfer, with the dehydrated material then freed of oil, including the oil which has been used as the heat transferring medium, and the solvent which has been used for extracting the oil then readily vaporized by said heat transfer and then recovered, the entire process being carried on with economical employment of heat and providing rapid and efficient dehydration, extraction of oil and distillation and recovery of the solvent used.

I claim:

1. In the extraction of oil from garbage, the steps including: heating the garbage in an oil bath to evaporate its moisture, extracting oil from the dehydrated garbage by use of a solvent, supplying the oil-bearing solvent to the oil bath for distillation therein, heating the dehydrated garbage in a dryer to evaporate remaining solvent, maintaining the oil bath and the dryer under partial vacuum and withdrawing the aqueous and solvent vapors and condensing the same, and reusing the solvent condensate for the aforementioned oil extraction.

2. In the extraction of oil from material, the steps including: heating the material in an oil bath to evaporate its moisture, extracting oil from the dehydrated material by use of a solvent, supplying the oil-bearing solvent to the oil bath for distillation therein, heating the dehydrated material in a dryer to evaporate remaining solvent, maintaining the oil bath and the dryer under partial vacuum and withdrawing the aqueous and solvent vapors and condensing the same, and reusing the solvent condensate for the aforementioned oil extraction.

3. In the extraction of oil from material, the steps including: supplying material to a heated oil bath while sealing the intake to the atmosphere, passing the material through the heated oil bath to evaporate its moisture, thence passing the dehydrated material through a solvent extraction chamber, thence passing the material through a dryer for evaporating remaining solvent, thence discharging the material while sealing the discharge to the atmosphere, passing solvent through the solvent extraction chamber counter to the passage of material therethrough, discharging oil-bearing solvent from the solvent extraction chamber into the heated oil bath for distillation therein, and maintaining the heated oil bath and the dryer under partial vacuum and withdrawing vapors therefrom.

4. In the extraction of oil from material, the steps including: passing the material through a heated oil bath to evaporate its moisture, thence passing the dehydrated material through a solvent extraction chamber, passing solvent through the solvent extraction chamber counter to the passage of material therethrough, discharging oil-bearing solvent from the solvent extraction chamber into the heated oil bath for distillation therein, and withdrawing aqueous and solvent vapors from the heated oil bath.

5. In the extraction of oil from material, the steps including: passing the material through a heated oil bath to evaporate its moisture, thence passing the dehydrated material through a solvent extraction chamber, supplying solvent to the solvent extraction chamber, discharging oil-bearing solvent from the solvent extraction chamber into the heated oil bath for distillation therein, and withdrawing aqueous and solvent vapors from the heated oil bath.

6. In extraction apparatus, an intake including a liquid seal, an oil bath communicating with said intake via said liquid seal, means for heating the oil bath, an extraction chamber communicating with the oil bath, means for supplying solvent to the extraction chamber, means for discharging oil-bearing solvent from the extraction chamber into the oil bath, a dryer communicating with the extraction chamber, a discharge for the dryer, means for sealing said discharge to the atmosphere, means for maintaining a partial vacuum in the oil bath and in the extraction chamber and dryer, and piping for withdrawing vapors from the oil bath and from the dryer by means of said partial vacuum.

7. In extraction apparatus, an oil bath for material which is to be treated, means for heating the oil bath, an extraction chamber communicating with the oil bath for passage of the material therethrough, means for passing solvent through the extraction chamber counter to the passage of material therethrough, means for discharging oil-bearing solvent from the extraction chamber into the oil bath, and piping for withdrawing vapors from the oil bath.

8. In extraction apparatus, an oil bath for material which is to be treated, means for heating the oil bath, an extraction chamber communicating with the oil bath, means for supplying solvent to the extraction chamber, means for discharging oil-bearing solvent from the extraction chamber into the oil bath, and piping for withdrawing vapors from the oil bath.

9. In extraction of oil, the steps including: heating material in an oil bath to evaporate moisture, extracting oil from the dehydrated material by means of a solvent, supplying the oil-bearing solvent to the oil bath for distillation, maintaining the oil bath under partial vacuum, and withdrawing vapors from the oil bath.

10. In extraction of oil, the steps including: passing material through a heated oil bath to evaporate moisture, thence passing the dehydrated material through a solvent extraction chamber, passing solvent through the extraction chamber and continuously withdrawing the oil-bearing solvent and supplying it to the heated oil bath for distillation, and withdrawing vapors from the heated oil bath.

11. In extraction of oil, the steps including: heating material in an oil bath to evaporate moisture, extracting oil from the dehydrated material by means of a solvent, supplying the oil-bearing solvent to the oil bath for distillation, and withdrawing vapors from the oil bath.

12. In extracting apparatus, an oil bath for material which is to be processed, means for heating the oil bath, an extraction chamber communicating with the oil bath for passage of the material therethrough, means for passing solvent through the extraction chamber and continuously withdrawing the oil-bearing solvent and supplying it to the oil bath, and piping for withdrawing vapor from the oil bath.

13. In extraction of oil from oleaginous material containing moisture, the steps of solvent extracting oil from the material, heating the residual material in an oil bath for evaporating moisture and solvent, extracting oil from the dehydrated material by means of a solvent, supplying the oil-bearing solvent to the oil bath for distillation, and withdrawing vapors from the oil bath.

14. In extraction of oil from oleaginous material containing moisture, the steps of extracting oil from the material, heating the residual material in an oil bath for evaporating moisture, extracting oil from the dehydrated material by means of a solvent, supplying the oil-bearing solvent to the oil bath for distillation, and withdrawing vapor from the oil bath.

DAN McDONALD.